United States Patent [19]

Hirschberger

[11] Patent Number: 4,622,199

[45] Date of Patent: Nov. 11, 1986

[54] PROCESS FOR EXTRUDING HIGH MOLECULAR WEIGHT, HIGH DENSITY LINEAR ETHYLENE POLYMERS TO FORM HEAVY TUBULAR MEMBERS

[75] Inventor: Michael Hirschberger, Sylvania, Ohio

[73] Assignee: Owens-Illinois, Inc., Toledo, Ohio

[21] Appl. No.: 743,444

[22] Filed: Jun. 11, 1985

[51] Int. Cl.[4] .................. B29C 47/06; B29C 49/04
[52] U.S. Cl. .................. 264/514; 264/515; 264/173; 425/131.1; 425/133.1
[58] Field of Search .................. 264/514, 515, 173; 425/131.1, 133.1

[56] References Cited

U.S. PATENT DOCUMENTS

| | | | |
|---|---|---|---|
| 3,892,828 | 7/1975 | Weatherly et al. | 264/515 |
| 3,949,042 | 4/1976 | Utz | 264/515 |
| 3,980,744 | 9/1976 | Cogswell | 264/515 |
| 4,289,727 | 9/1981 | Herrington, Jr. | 264/514 |
| 4,327,053 | 4/1982 | Cogswell et al. | 264/515 |
| 4,364,981 | 12/1982 | Horner et al. | 264/173 |

FOREIGN PATENT DOCUMENTS 1603128  11/1981  United Kingdom ............... 264/515

*Primary Examiner*—Jeffery Thurlow
*Attorney, Agent, or Firm*—Philip M. Rice

[57] ABSTRACT

A process is disclosed for extruding heavy tubular shaped articles from high molecular weight, high density linear ethylene polymers under shearstress conditions such that the exterior surface of the extruded article would undergo melt fracture. Melt fracture is avoided by coextruding a thin layer of a second ethylene polymer in contact with the high molecular weight, high density linear ethylene polymer and the outer lip of the annular die. The second ethylene polymer has melt flow properties such that it does not exhibit melt fracture at the temperature and shear rate employed in extruding the tubular shaped article.

13 Claims, No Drawings

PROCESS FOR EXTRUDING HIGH MOLECULAR WEIGHT, HIGH DENSITY LINEAR ETHYLENE POLYMERS TO FORM HEAVY TUBULAR MEMBERS

BACKGROUND OF THE INVENTION

Ethylene polymers of both the low density type and the high density type are used in large volume to manufacture blow molded articles such as containers. In the manufacture of such articles, the ethylene polymer is extruded in the form of a tube, which frequently is referred to as a parison. The freshly extruded parison is blown to form the desired article. Such processes are quite efficient in the fabrication of modest size containers weighing up to about 100 grams and having volumetric capacities of up to about 1 gallon. Difficulties are encountered, however, in preparing larger containers of desired strength at high production rates. Difficulties also are encountered in preparing both small and large containers from ethylene polymers having very high molecular weights or low melt indexes.

By reason of the relatively low cost of ethylene polymers, there is a growing interest in employing such polymers to prepare larger articles having volumeteric capacities of up to about 50 gallons or even larger. For a number of reasons, difficulties are encountered in preparing such large articles. Specifically the parisons required to prepare such large blow molded articles are longer in length than the parisons employed to prepare smaller articles and are significantly heavier per unit length. The molten parisons have relatively little strength at the temperature at which they are extruded and large heavy parisons tend to draw down excessively as the molten polymer leaves the extrusion die. This leads to numerous problems including the maintenance of proper wall thickness in the parison and the blow molded article prepared therefrom.

It is known that the melt strength of the extruded parison is a function of the viscosity of the molten ethylene polymer contained therein at its prevailing temperature. It also is known that the viscosity of any molten ethylene polymer is a function of its temperature, with the viscosity increasing as the molten ethylene polymer's temperature is lowered. Knowledge of this relationship suggests that the strength of an extruded parison can be increased in either of two ways. When dealing with a specified ethylene polymer, the viscosity of the molten ethylene polymer can be increased by extruding the parison at lower temperatures. Once the extrusion temperature is fixed, the strength of the extruded parison can be increased by selection of an ethylene polymer of higher molecular weight which has a higher viscosity at the designated temperature.

To lower the temperature of the extrudate, it is necessary to reduce the speed of the extruder screw. This lowers the extruder output and increases the operating costs of the process.

The option of improving the melt strength of the parison by employing an ethylene polymer having an inherently higher melt viscosity at the selected extrusion temperature is more attractive. The use of ethylene polymers having higher melt viscosities to prepare blow molded articles is somewhat limited, however, by reason of the fact the the extrusion of such ethylene polymers into parisons sometimes is accompanied by the undesireable phenomenon known in the art as melt fracture. Melt fracture occurs when the shear-stress on the molten polymer exceeds approximately $3-6 \times 10^6$ dynes/cm$^2$. Shear stress is the product obtained by multiplying the polymer's apparent melt viscosity in poises by the shear rate in sec$^{-1}$.

When an ethylene polymer is extruded under conditions giving rise to melt fracture, the surface of the extrudate leaving the die has an irregular rough surface. Workers in the art sometimes refer to such surfaces as having a "shark skin" appearance. As a minimum, the surface of the extrudate is aesthetically unpleasing. In some cases, the irregular exterior surface has an adverse effect on the physical properties of the ultimate finished article. Thus, it is undesirable to extrude parisons under conditions of melt fracture.

For the reasons noted above, there is a need in the art for an improved process for extruding high molecular weight ethylene polymers into heavy tubular shaped members such as parisons at high productivity rates under conditions which do not give rise to melt fracture.

SUMMARY OF THE INVENTION

The present invention provides a process for extruding high molecular weight, high density linear ethylene polymers through annular dies to form heavy tubular shaped members* weighing at least about 0.9 gms/linear cm under shear-stress conditions such that the exterior surface of the tubular shaped member ordinarily would have an irregular rough exterior surface indicative of melt fracture. By the process of the invention, however, such melt fracture is eliminated by coextruding a thin layer of a second ethylene polymer in contact with the outer surface of the parison of the high molecular weight, high density linear ethylene polymer and the outer lip of the annular die. The second ethylene polymer employed is one having melt flow properties such that it does not exhibit melt fracture at the temperature and shear rate employed in extruding the tubular shaped member. The parison then is blow molded employing conventional techniques.

*For convenience of description, in the subsequent discussions the term parison sometimes will be used interchangeably with and in lieu of the longer term "tubular shaped member".

The invention also provides a process for preparing modest size blow molded containers having high strength-to-weight ratios. A multilayer parison is prepared as described above in which the main layer is a high molecular weight, high density linear ethylene polymer and at least the outer layer is a second ethylene polymer, both polymers having the melt flow properties as described herein. The parison is extruded under shear-stress conditions such that the parison, if prepared solely from the high molecular weight, high density ethylene polymer, would exhibit melt fracture. The second ethylene polymer included in the parison, by reason of its lower melt viscosity, prevents any melt fracture. The parison thus prepared is blow molded by conventional techniques.

The heavy multiwall tubular extrudates as prepared above also can be used for purposes other than the preparation of containers. For example, such extrudates can be used as seamless pipe.

DETAILED DESCRIPTION OF THE INVENTION

The high molecular weight, high density linear ethylene polymers (hereinafter for convenience sometimes identified as the "first ethylene polymers") employed in the practice of the invention will have a density of at least about 0.94 gm/ml and a weight average molecular weight of at least about 200,000, preferably at least about 250,000, and more especially at least about 300,000. Such first ethylene polymers typically will have the properties set forth in Table I below.

TABLE I

| Property | Operable Range | Preferred Range |
| --- | --- | --- |
| Normal Load Melt Index, gms/10 min. (ASTM 1230-Condition E) | 0.04–0.20 | 0.05–0.15 |
| High Load Melt Index, gms/10 min. (ASTM 1230-Condition F) | 4–20 | 5–15 |
| Weight Average Molecular Weight ($M_w$) | 200,000–500,000 | 250,000–350,000 |
| Density gm/ml (ASTM D1505) | 0.941–0.953 | 0.941–0.953 |
| Flexural Modulus, psi (ASTM D-747) | 120,000–175,000 | 130,000–140,000 |
| Tensile Properties (ASTM D-638) | | |
| Tensile @ yield, psi | 2,500–4,500 | 3,500–4,000 |
| Modulus, psi | 30,000–110,000 | 60,000–100,000 |
| Ultimate elongation, % | 500–950 | 600–800 |
| Environmental stress-crack resistance, hours to 50% failures (ASTM D-1693-Condition B) | >250 | >600 |

The first ethylene polymers having melt flow and physical properties as set forth above are known and reported in the art. Moreover, first ethylene polymers are commercially available from numerous commercial producers. An example of a presently preferred commercial product is HOSTALEN GM 7746B supplied by AMERICAN HOECHST PLASTICS. Several of the manufacturer's reported properties for this product are set forth in Table II below.

TABLE II

| Property | ASTM Test Method | Unit | Value |
| --- | --- | --- | --- |
| Melt Index | D 1238, Cond. E | g/10 min | 0.1 |
| Melt Index | D 1238, Cond. P | g/10 min. | 0.4 |
| High Load Melt Index | D 1238, Cond. F | g/10 min. | 11.0 |
| Density | D 1505 | g/cm$^3$ | 0.94 |
| ESCR, F 50 | D 1693, Cond. B | hr. | >750 |
| Izod Impact | D 256, Cond. A | ft. lb./in. of notch | 12 |
| Hardness, Shore | D 2240, Cond. D | — | 65 |

The high molecular weight, high density linear ethylene polymers can be prepared by polymerizing ethylene, optionally in the presence of an alpha-monoolefin comonomer containing 4 to 12 carbon atoms, in the presence of certain metallic catalysts such as chromium catalysts, e.g., $CrO_3$ supported on silica-alumina supports, and the Ziegler-Natta catalysts, e.g., $TiCl_3$ employed in conjunction with certain aluminum alkyl cocatalysts. The requisite molecular weight—which principally influences the melt flow properties including melt viscosity—is obtained by proper control of polymerization conditions including temperature, pressure, comonomer concentration, and the concentration of telegenating agents such as hydrogen.

The second ethylene polymer that is employed in the process of the invention can be any ethylene polymer having a normal load melt index greater than about 0.20 and preferably greater than about 0.25. Such second ethylene polymers may be of either the low density type or the high density type. The low density ethylene polymers prepared by free radical initiated polymerization processes can be ethylene homopolymers or ethylene copolymers including therein polymerized comonomers such as vinyl acetate, acrylate esters and the like. Preferably, however, the second ethylene polymer employed will be a linear ethylene polymer similar to the first ethylene polymer, but one which differs therefrom in having a higher melt index. Such second ethylene polymers are well known in the art and are available from multiple commercial sources. The preferred second ethylene polymers will have the properties set forth in Table III below.

TABLE III

| Property | Operable Range | Preferred Range |
| --- | --- | --- |
| Normal Load Melt Index, gms/10 min. (ASTM 1238-Condition E) | Less than about 20 | Less than about 10 |
| Weight Average Molecular Weight, ($W_w$) | Less than 250,000 | Less than 200,000 |
| Density, gms/ml | At least 0.941–0.965 | At least 0.952–0.960 |
| Flexural Modulus, psi (ASTM D-747) | At least about 85,000 | At least about 100,000 |
| Tensile Properties (ASTM D-638) | | |
| Tensile @ yield, psi | At least about 3,100 | At least about 3,500 |
| Elastic Modulus, psi | At least about 30,000 | At least about 60,000 |
| Ultimate Elongation, % | At least about 500 | At least about 600 |

The two ethylene polymers employed in the process should be selected so that the ratio of their melt viscosities (at the extrusion temperature) does not exceed about 3:1. At higher ratios, there exists a potential problem of interfacial instability.

The apparatus employed to extrude the heavy tubular shaped members by the process of the invention can be of any type presently employed to prepare such heavy tubular shaped members. The diameter of the die annulus will be dictated by the geometry of the article to be blow molded from the extruded parison. The die gap typically will be at least about 0.025" to prepare heavy parisons for use in blow molding containers. Parisons as extruded through such die gaps typically will weigh at least about 0.9 gms/linear cm.

The extrusion die employed will have at least two and preferably three channels to receive and feed to the die annulus both the first and the second ethylene polymers. One channel will feed the second ethylene polymer so as to form the outer layer of the extruded parison. A second channel will feed the first ethylene polymer to form the main body of the extruded parison. The third channel, if employed, will feed the second ethylene polymer to form the inner layer of the extruded parison. Suitable extruders having the capacity to feed the two ethylene polymers to the die block in the requisite weight ratios will be provided.

The two polymers will be fed to the die in weight ratios such that the second ethylene polymer in the extruded parison constitutes about 3–40 and preferably 5–15 weight % of the two ethylene polymers. Typically, the parison will be extruded at a die temperature in the range of about 390°–460° and preferably 400°–420° F.

The following examples are set forth to illustrate more clearly the principles and practice of the invention to those skilled in the art. Where parts and/or percentages are set forth, they are parts and/or percentages on a weight basis unless otherwise indicated.

EXAMPLE I

Part A

Parisons were prepared on a Bekum BMO-I blow molding machine equipped with a Kautex coextrusion head. The die had an annular diameter of 0.715 inch. The die gap opening was set at 0.025 inch. The Kautex head is designed to prepare a three layered extruded annular member. Polymer to be included in the intermost layer of the extruded parison, i.e., to form its internal surface, is fed to the die by a first 60 mm extruder including a screw having an L/D ratio of 24. Polymer to be included in the intermediate layer of the parison is fed to the die by a second 1.25 inch extruder including a screw having an L/D ratio of 24. Polymer to be included in the outermost layer of the extruded parison, i.e., to form its external skin surface, is fed to the die by a third 1.25 inch extruder including a screw having an L/D ratio of 24.

In this Part A, a high molecular weight, high density linear ethylene polymer sold under the trademark HOSTALEN GM 7746B was fed through each of the extruders to the die. The properties of this polymer are set forth supra in Table II. Each of the extruders was operated to feed a polymer melt to the die at a temperature of about 229° C. (445° F.) immediately upstream of the die gap. The screw of the first extruder was operated at 62 rpm. The screw of the second extruder was operated at approximately 30 rpm. The screw of the third extruder was operated at about 38 rpm. The output pressure on the first extruder was 4400 psi. Under these conditions, the Newtonian shear rate at the die wall on the polymer exiting at the outer lip of the die was approximately 2833 sec$^{-1}$. The parison was extruded at a rate of 64 lbs./hr. to provide a parison having a weight of about 2.3 gms/linear cm. The parison was not blow molded, but was dropped into a cooled water bath so that its outer skin surface could be examined. The outer surface was rough and irregular by reason of considerable melt fracture encountered under these extrusion conditions.

Part B

Part A was repeated except that the screw speed of the third extruder was cut back to its lowest operating speed. Under these conditions, the polymer in this extruder was maintained in a molten condition but essentially none of the polymer was fed to the die. This adjustment was made to obtain an indication of approximately the amount of polymer included in the parison of Part A that was received from this extruder. The parison was produced at a reduced rate of approximately 61 lbs./hr. which indicated that approximately 5 weight % of the parison in Part A was delivered from this extruder. The output pressure on the first extruder did not change and was 4400 psi. The Newtonian shear rate at the die wall under these conditions was 2660 sec$^{-1}$. Again, the outer surface of the parison was rough and this was an indication that the parison was extruded under conditions of high melt fracture.

Part C

Part A was repeated except that a lower molecular weight linear ethylene polymer sold under the trademark Pethrothene LC 732 was fed through the third extruder feeding the polymer which formed the outer skin of the parison. This polymer had the properties shown in Table IV.

TABLE IV

| Property[1] | Value |
| --- | --- |
| Density, gms/ml | 0.953 |
| Normal Load Melt Index, gms/10 min. | 0.28 |
| Tensile @ Yield, psi | 3850 |
| Elongation @ Break, % | 850 |
| Flexural Stiffness, psi | 120,000 |

[1]Determined by ASTM methods noted supra.

Once equilibrium conditions were established, several significant changes in extrusion conditions were noted as compared with the conditions of Part A. The output pressure on the first extruder fell from 4400 psi to 4200 psi. There was a concomitant reduction in the power drawn by the first extruder. There also was a significant reduction in the power drawn by the third extruder. The outer skin surface of the parison produced under these conditions was very smooth and showed no evidence of melt fracture.

Part D

After equilibrium conditions had been established in Part C, power to the third extruder feeding polymer to the outer surface of the parison was increased to the approximate load drawn in Part A. The screw speed increased to 68 rpm. As a result, the parison was produced at a rate of about 70 lbs./hr., with the outer layer of Pethrothene LC 732 constituting about 14 weight % of the parison. The outer skin surface of the parison was very smooth and showed no evidence of melt fracture.

The output pressure on the first extruder was 4250 psi. The power drawn on the first extruder was lower than that drawn in Part A.

The data set forth in the above example demonstrate several unobvious advantages obtained by use of the process of the invention. Of prime importance is the fact that the outer surfaces of the parisons produced in both Part C and Part D were very smooth and free of the surface defects associated with the melt fracture obtained when the process was carried out by the prior art processes set forth in Part A and Part B. When the operating data of Part C are compared with the operating data of Part A, it is noted that the power consumption of the extruders required to produce the parison was reduced with no reduction in the rate at which the parison was produced. When the operating results of Part D are compared with Part A, it is noted that the parison was produced at a faster rate. This faster rate was obtained even though the total power consumption was lowered by reason of the lower power consumption drawn by the first extruder.

The process of the invention provides significant advantages and flexibility to those interested in preparing blow molded articles. At the present state of the art, it is known that very high molecular weight, high density linear ethylene polymers are available which have excellent strength properties and excellent environmental stress crack resistance. By reason of their very high melt viscosities, however, it has been necessary to extrude such ethylene polymers into parisons at unacceptably low extrusion rates (to lower the shear-stress) to avoid melt fracture. By employment of the process of the present invention, however, it is now possible to prepare parisons from such very high molecular weight, high density ethylene polymers at commercially acceptable extrusion rates without experiencing melt fracture. The process of the invention also provides substantial flexibility in the operation of blow molding processes. By employing the process of the present invention, the parison can be extruded at equivalent rates at lower extrusion temperatures. This permits shorter cooling cycles and increases the output of the blow molding machine. It also provides better control of side wall thickness.

It frequently is desirable to print product information on the exterior surface of large blow molded articles. By reason of the inherent surface characteristics of high molecular weight, high density linear ethylene polymers, it is difficult to print on the surface of blow molded articles prepared therefrom. This difficulty can be overcome by the practice of the present invention in which a more printable ethylene copolymer, such as an ethylene-vinyl acetate or an ethylene-acrylate ester copolymer, is employed as the second ethylene polymer and which forms the surface skin of the blow molded article.

The process of the invention can be used to prepare containers of various sizes at efficient production rates. The process is particularly useful in producing large containers weighing over 100 grams and having capacities in excess of one gallon.

While the invention has been described principally with respect to extruding parisons which subsequently are blow molded, the process of the invention is not limited to the extrusion of parisons for blow molding purposes. The process is equally adapted to the extrusion of heavy wall tubular articles such as pipe and the like. In addition, where desired, an additional layer of a second ethylene polymer can be coextruded with the tubular shaped member and in contact with the inner lip of the annular die.

While the processes herein described constitute preferred embodiments of the invention, it is to be understood that the invention is not limited to these specific processes and that changes may be made therein without departing from the scope of the invention which is defined in the appended claims.

What is claimed is:

1. In a process for extruding a first high molecular weight, high density linear ethylene polymer through an annular die to form a heavy tubular shaped member weighing at least about 0.9 gms/linear cm at a temperature and a shear rate such that an extrudate prepared solely therefrom would exhibit melt fracture; the improvement which comprises eliminating said melt fracture by coextruding a thin layer of a second ethylene polymer in contact with said first high molecular weight, high density linear ethylene polymer, said layer of said second ethylene polymer also being extruded in contact with the wall of said annular die; said second ethylene polymer having melt flow properties such that it does not exhibit melt fracture at the temperature and shear rate employed in extruding said tubular shaped member; said first ethylene polymer having a Normal Load Melt Index (ASTM 1230 - Condition E) of 0.04–0.20 gms/10 min., a High Load Melt Index (ASTM 1230 - Condition F) of 4–20 gms/10 min., a density of at least about 0.94 gm/ml and a weight average molecular weight of at least about 200,000; and said second ethylene polymer having a Normal Load Melt Index (ASTM 1230 - Condition E) greater than 0.20 gms/10 min.

2. The process of claim 1 in which the weight of the second ethylene polymer employed constitutes about 3–40 weight % of the two ethylene polymers.

3. The process of claim 1 in which the tubular member is extruded at a die temperature in a range of about 390°–460° F.

4. The process of claim 1 in which the second ethylene polymer is a linear ethylene polymer having a density of 0.941–0.965 gms/ml.

5. The process of claim 1 in which the second ethylene polymer is extruded in contact with both the inner and outer surfaces of the tube of the high molecular weight, high density linear ethylene polymer.

6. The process of claim 2 in which the second ethylene polymer is extruded in contact with both the inner and outer surfaces of the tube of the high molecular weight, high density linear ethylene polymer.

7. The process of claim 3 in which the second ethylene polymer is extruded in contact with both the inner and outer surfaces of the tube of the high molecular weight, high density linear ethylene polymer.

8. A process for blow molding containers which consists essentially of:
(a) extruding a layered parison weighing at least about 0.9 gm/linear cm and having an inner layer of a first ethylene polymer and an outer layer of a second ethylene polymer;
(b) clamping the parison of step (a) in a mold; and
(c) blowing the clamped parison of step (b) to form a container;

said first ethylene polymer being a high molecular weight, high density linear ethylene polymer having a Normal Load Melt Index (ASTM 1230 - Condition E) of 0.04–0.20 gms/10 min., a High Load Melt Index (ASTM 1230 - Condition F) of 4–20 gms/10 min., a density of at least about 0.94 gm/ml and a weight average molecular weight of at least about 200,000; said second ethylene polymer having a Normal Load Melt Index (ASTM 1230 - Condition E) greater than 0.20 gm/10 min. and a melt viscosity lower than the melt viscosity of said first ethylene polymer; the polymer temperature and the extrusion rate in step (a) being such that, if the parison consisted solely of the first ethylene polymer, the parison would exhibit melt fracture, but being such that the layered parison does not exhibit melt fracture.

9. The process of claim 8 in which the weight of the second ethylene polymer employed constitutes about 3–40 weight % of the two ethylene polymers.

10. The process of claim 8 in which the parison is extruded at a die temperature in a range of about 390°–460° F.

11. The process of claim 8 in which the second ethylene polymer is a linear ethylene polymer having a density of 0.941–0.965 gms/ml.

12. The process of claim 8 in which the second ethylene polymer is extruded as both the inner and outer surfaces of the parison.

13. The process of claim 9 in which the second ethylene polymer is extruded as both the inner and outer surfaces of the parison.

* * * * *